(12) United States Patent
Denzel et al.

(10) Patent No.: US 10,284,682 B2
(45) Date of Patent: May 7, 2019

(54) ENABLEMENT OF QUOTA-BASED QUALITY OF SERVICE

(71) Applicant: International Business Machines Corporation, Armonk, NY (US)

(72) Inventors: Wolfgang E. Denzel, Langnau am Albis (CH); Cyriel J. Minkenberg, Gutenswil (CH); Bogdan Prisacari, Adliswil (CH); German Rodriguez Herrera, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 370 days.

(21) Appl. No.: 15/133,289

(22) Filed: Apr. 20, 2016

(65) Prior Publication Data
US 2017/0310788 A1    Oct. 26, 2017

(51) Int. Cl.
*H04L 29/08* (2006.01)

(52) U.S. Cl.
CPC ............ *H04L 67/327* (2013.01); *H04L 67/16* (2013.01); *H04L 67/322* (2013.01)

(58) Field of Classification Search
CPC ........ G06F 9/50; G06F 9/5022; G06F 9/5011; H04L 67/327; H04L 67/16
See application file for complete search history.

(56) References Cited

U.S. PATENT DOCUMENTS

| 6,104,700 | A | 8/2000 | Haddock | |
|---|---|---|---|---|
| 2014/0068624 | A1* | 3/2014 | Fuller | G06F 9/5011 718/104 |
| 2014/0282589 | A1 | 9/2014 | Kuang | |
| 2015/0249621 | A1* | 9/2015 | Tian | H04L 47/822 709/226 |

OTHER PUBLICATIONS

Alfaro, Francisco J., et al. "A strategy to compute the InfiniBand arbitration tables." Parallel and Distributed Processing Symposium., Proceedings International, IPDPS 2002, Abstracts and CD-ROM. IEEE, 2001. (39 Pages).

(Continued)

*Primary Examiner* — Dady Chery
(74) *Attorney, Agent, or Firm* — Cantor Colburn LLP; David Quinn

(57) ABSTRACT

Disclosed herein is a system comprising a plurality of agents that desire access to a resource; a finite amount of an internal state; a processor that is configured to enforce an arbitration mechanism to translate a quota specification for the plurality of agents according to a set of rules comprising i) all classes of service that are serviceable are served according to the quota specification; ii) if an underserviced class is not serviceable, a serviceable class continues to be granted access to the one or more resources even if the granted access leads to an increase in the underservice of a non-serviceable class; iii) as soon as the underserviced class becomes serviceable, it will in priority recuperate its accumulated disadvantage until its quota specification is reached; and iv) the internal state is updated upon reaching boundary conditions.

20 Claims, 4 Drawing Sheets

(56) References Cited

OTHER PUBLICATIONS

Alfaro, Francisco J., et al. "QoS in InfiniBand subnetworks." Parallel and Distributed Systems, IEEE Transactions on 15.9 (2004): 810-823.

Guérin, R. et al. "Quality-of-service in packet networks: basic mechanisms and directions", Computer Networks, vol. 31, Issue 3, Feb. 11, 1999, pp. 169-189.

Pelissier, J. "Providing quality of service over Infiniband architecture fabrics." Proceedings of the 8th Symposium on Hot Interconnects. 2000. (6 Pages).

Reinemo, S., et al. "An overview of QoS capabilities in InfiniBand, advanced switching interconnect, and ethernet." IEEE Communications Magazine 44.7 (2006): pp. 32-38.

* cited by examiner

ENABLEMENT OF QUOTA-BASED QUALITY OF SERVICE

BACKGROUND

This disclosure relates to an efficient and exact mechanism for enablement of quota-based quality of service.

When multiple agents need access to a shared resource it is usually the case that some form of access control (e.g., a quality of service (QoS) policy) is used. The most basic form of quality of service is prioritization, in which a priority value is assigned to each agent and the agent with the highest priority is always granted access to the resource while it requires that access. Ties between agents with the same priority are generally broken arbitrarily or according to a secondary policy.

The main drawback of such a policy is that high priority agents can end up monopolizing the resource and causing starvation for the lower priority agents. An alternative option is to enforce proportional access to the resource. Each class of service (designating one or more agents) is assigned a value called a quota. Each class of service then receives access in proportion to the quota assigned to it. For example, if there were two classes of service with quotas of 100 and 10 respectively, access would be granted 100/10=10 times more often to the first class than to the second. An example of real-world usage of such a policy is the quality of service specification used in Infiniband network fabrics.

Designing mechanisms enabling quota-based resource allocation is not straightforward and needs to balance cost (e.g., the cost of providing the internal resources necessary for the arbitration) and precision (e.g., how well the resulting allocation conforms to the specification). It is therefore desirable to design an allocation mechanism that achieves a middle ground between costs and precision with a controllable tradeoff.

SUMMARY

Disclosed herein is a system comprising a plurality of agents that desire access to a resource; a finite amount of an internal state; a processor that is configured to enforce an arbitration mechanism to translate a quota specification for the plurality of agents according to a set of rules comprising i) all classes of service that are serviceable are served according to the quota specification; ii) if an underserviced class is not serviceable, a serviceable class continues to be granted access to the one or more resources even if the granted access leads to an increase in the underservice of a non-serviceable class; iii) as soon as the underserviced class becomes serviceable, it will in priority recuperate its accumulated disadvantage until its quota specification is reached; and iv) the internal state is updated upon reaching boundary conditions.

Disclosed herein too is a method comprising operating a system comprising a plurality of agents that desire access to a resource; a finite amount of an internal state; enforcing, using a processor, an arbitration mechanism to translate a quota specification for the plurality of agents according to a set of rules comprising: i) servicing all classes of service that are serviceable according to a quota specification; ii) granting access to one or more resources if an underserviced class is still not serviceable and if a serviceable class continues to request resources despite leading to an increase in an underservice of a non-serviceable class; iii) servicing the underserviced class as soon as it becomes serviceable, iv) recuperating an accumulated disadvantage of the underserviced class until its quota specification is reached; and v) updating a state of the system upon reaching boundary conditions.

Disclosed herein too is a computer program product comprising a non-transitory storage medium readable by a processing circuit and storing instructions for execution by the processing circuit for performing a method for deadlock avoidance in a network, the method comprising i) servicing all classes of service that are serviceable according to a quota specification; ii) granting access to one or more resources if an underserviced class is still not serviceable and if a serviceable class continues to request resources despite leading to an increase in an underservice of a non-serviceable class; iii) servicing the underserviced class as soon as it becomes serviceable, iv) recuperating an accumulated disadvantage of the underserviced class until its quota specification is reached; and v) updating a state of a system upon reaching boundary conditions.

DETAILED DESCRIPTION

Figure 1:
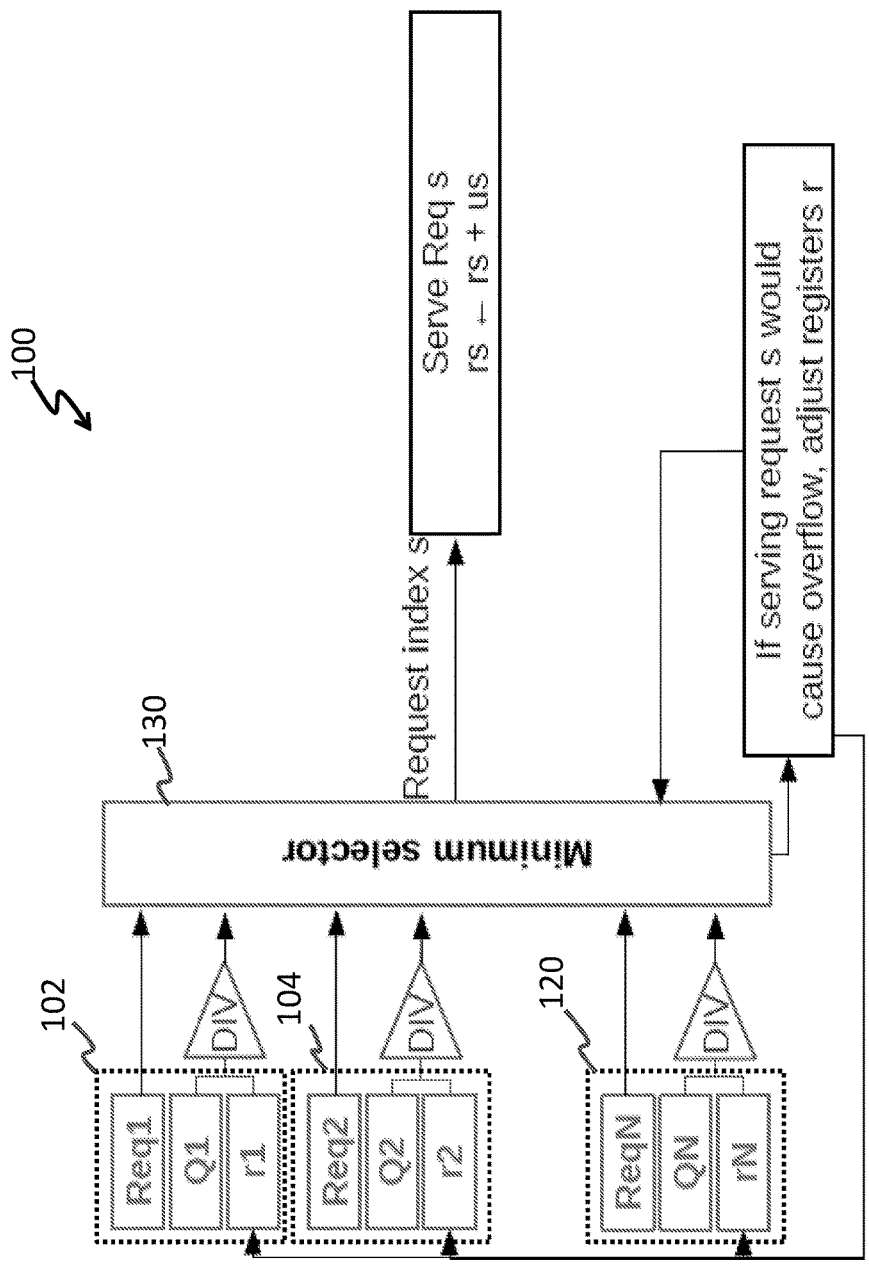
FIG. 1 is a depiction of an exemplary mechanism for an enablement of quota based quality of service.

Disclosed herein is an arbitration mechanism (hereinafter "mechanism") for a system that is used to translate a quota specification to actual proportional resource access. The mechanism applies to a plurality of agents that require access to one or more resources available in a system. The mechanism includes a quota enforcement that is contingent upon the presence of sufficient resources in the system and, in the event of insufficient resources, includes a graceful degradation of quota enforcement. In an exemplary embodiment, the system that employs the mechanism may be a network system such as an InfiniBand network, a network on a chip (NoC), a system on a chip (SoC), or a combination thereof. In principle, the arbitration mechanism is not limited to the aforementioned network systems and may be deployed in a multitude of systems where there is a limit on available resources and where demand for these resources can, from time to time, exceed the available resources. In an exemplary embodiment, the system is an InfiniBand network.

The mechanism comprises determining order of access for a shared resource where several agents simultaneously desire access to the resource. The mechanism is quota based and over an extended period of time, each agent receives access to the resource in proportion to its quota value. The quotas are respected even for agents that need access to the resources sporadically—and the mechanism permits the retroactive filling of quotas.

More specifically, disclosed herein is a mechanism for regulating the access of a plurality of agents to a one or more shared resources in a system, wherein every agent is assigned a weight (quota) value and wherein at every moment when the mechanism needs to make an access decision every agent requires a certain amount of resource usage. In an embodiment, the resource usage required by a particular agent at a given time in the operation may be zero. Agents with a resource usage requirement of zero are denoted as inactive (or non-serviceable), while agents with a non-zero resource usage requirement are denoted as active (or serviceable).

The mechanism ensures that the amount of total usage of the resource by each agent is proportional to the weight of that agent (contingent on that agent actually requesting at least that amount of access) and this property is preserved across all agents even when a subset of the agents are inactive for prolonged periods (of tunable bounded duration, wherein duration is expressed in amount of resource used by other agents).

In an embodiment, if a subset of agents are inactive for a period that exceeds the bounded duration, the service levels of that subset of agents degrades gracefully when the inactive agents do become active (i.e., when the inactive agents are activated). The term "degrading gracefully" implies that the system maintains a certain level of functionality even when resources are limited and a hitherto inactive agent becomes active. The mechanism achieves this without needing information beyond what is available to it locally (i.e., local information available to it at the time of making each decision) and a limited amount of internal state. In one embodiment, the internal state refers to registers, whose functions are detailed below.

Disclosed herein is a system comprising a plurality of agents that desire access to one or more resources and a plurality of registers that facilitate communication between the plurality of agents and the one or more resources. The system may comprise a processor that is configured to enforce the arbitration mechanism to translate a quota specification for the plurality of agents according to a particular set of rules. The rules are as follows: i) all classes of service that are serviceable are served according to a quota specification; ii) if an underserviced class is still not serviceable, a serviceable class continues to be granted access to the one or more resources despite leading to an increase in an underservice of a non-serviceable class; iii) as soon as the underserviced class becomes serviceable, it will in priority recuperate its accumulated disadvantage until its quota specification is reached; and iv) the state is updated upon reaching boundary conditions.

Disclosed herein too is a method comprising operating a system that comprises a plurality of agents that desire access to one or more resources and a plurality of registers that facilitate communication between the plurality of agents and the one or more resources. The method uses a processor that is operative to enforce an arbitration mechanism to translate a quota specification for the plurality of agents according to i) servicing all classes of service that are serviceable according to a quota specification; ii) granting access to the one or more resources if an underserviced class is still not serviceable and if a serviceable class continues to request resources despite leading to an increase in an underservice of a non-serviceable class; iii) servicing the underserviced class as soon as it becomes serviceable, iv) recuperating an accumulated disadvantage of the underserviced class until its quota specification is reached; and iv) updating the state of the system upon reaching boundary conditions.

FIGS. 1-4 depict the mechanisms disclosed herein. FIG. 1 depicts a system 100 that comprises a plurality of 102, 104 . . . 120, each corresponding to a class of agent requesting access to the resource. The entries are numbered from 1 to N, N being an integer denoting the total amount of agent classes. The entries comprise arbiter state, class current status and quota configuration. The internal state can for example be represented by N B-bit registers $r_i$, with i between 1 and N. The registers act as counters for the amount of access granted. The quota configuration is achieved via N user specified quota values $Q_i$. Finally, the amount of access to the resource required by each class is denoted by $Req_i$. The system 100 also comprises a minimum selector 130 that enables the choice of the next agent to be served based on the internal state and the request status corresponding to each agent. The system 100 involves a tunable parameter B that quantifies the amount of internal state that the arbiters are allowed to have. It can for example represent the total number of bits used to codify the value of each of the registers $r_i$. B can be tuned depending on availability of system resources and strictness of conformity to the quota specification.

With reference to the FIG. 1, the mechanism deployed by the system 100 may be defined by four functions described in detail below. These four functions may be established and performed by a processor (not shown).

a. State initialization—where each one of the $r_i$ registers is set to a value of 0. In other words, the initial state for each register (agent class) is set to 0—i.e., no usage of the resource by any agent has been recorded initially.

b. Choice of a class of agents to serve next given the current state of the registers. This step involves making a decision about which agent should receive access to the resource. More specifically, it involves determining the ratio between the register value and the quota for each agent class and selecting across serviceable classes the one with the minimum such ratio. It comprises dividing the $r_i$ value of each one of the registers of the serviceable classes and the quota $Q_i$ value of the same respective class and picking a class that has the minimum ratio value to give access to the resource. Only one class receives access to the resource at a time. Classes may be serviced in order of increasing ratio or according to another specified mathematical protocol.

c. Update of state upon making choice of class—this step involves updating the internal state upon giving access to a particular class. In this step, the state register of the serviced class is incremented by the access amount. For example, in a network switch port that arbitrates access to the outgoing link, the access amount typically takes the form of the number of packets or number of bytes sent on the link from a class.

Under a large enough amount of internal state, as determined by the tunable parameter B, these three mechanisms (a, b and c as listed above) ensure the following behavior:

i) all classes of service that are serviceable are served exactly according to the quota specification.

ii) if an underserviced class is still not serviceable, the serviceable classes continue to be granted access to the resource despite this leading to an increase of the underservice of the non-serviceable class (which is a positive aspect, as this maximizes resource usage).

iii) as soon as an underserviced class becomes serviceable, it will in priority recuperate
its accumulated disadvantage until the quota specification is reached.

d. update of state upon reaching boundary conditions (counter overflow). This point deals with the case where the inherent limitations of the internal state (the finite value of B) come into play. Eventually, a state register will reach its maximum value and not allow further incrementing. It then becomes impossible to preserve the previously specified properties rigorously (specifically property iii) because the disadvantage that a non-serviceable class accumulates exceeds what can be expressed in the space of one register. It is desirable however, to preserve rigorously the other two properties (i, ii). This is not trivial and is accomplished as follows. To allow further incrementation of state registers, when the incrementing of a register $r_s$ causes an overflow, the register is decremented such that the overflow no longer occurs. However, to maintain properties i) and ii) in future steps, in addition to decreasing the value of $r_s$, it is desirable to also decrease all non-zero state registers $r_i$ by some amount $\Delta_i$ which is chosen as follows.

The values of the individual $\Delta_i$'s are chosen such that for all classes of service for which the register $r_i$ is not null:

A1) $\Delta_i \leq r_i$

B1) $\Delta_i/Q_i = \Delta_s/Q_s$, for all i for which where $r_i$ is not null, and where $\Delta_s$ is the decrease of register $r_s$ This ensures that properties i) and ii) are maintained. The exact value of each $\Delta_i$ is not completely determined by the equations above. There is a spectrum of choices between two extremes—a minimum change corresponding to the set (across i) of smallest $\Delta_i$ values while respecting A1, B1, and a maximum change corresponding to the set (across i) of largest $\Delta_i$ values while respecting A1 and B1. The minimum approximately corresponds to decreasing by 1 the counter register corresponding to the lowest quota and the maximum corresponds to decreasing to 0 the counter of the smallest $r_i/Q_i$ ratio (each of these two conditions then uniquely determine all $\Delta_i$'s).

Within the spectrum, the closer the deltas (adjustments) are to the minimum value possible, the fairer the system is towards the not-yet-serviceable classes, but the system also suffers from more frequent update steps—i.e., the system is less efficient. On the other hand, the closer the deltas are to the maximum value possible, the more efficiently the system operates (in that the system needs to deal with boundary conditions less often) but it is also less fair towards not-yet-serviceable classes.

In short, the accuracy-efficiency trade-off is controlled by the value of the deltas.

It is possible that a single application of step d is insufficient to avoid overflow, in which case the step is applied repeatedly until incrementing the value of $r_s$ is possible without causing overflow.

Figure 2:
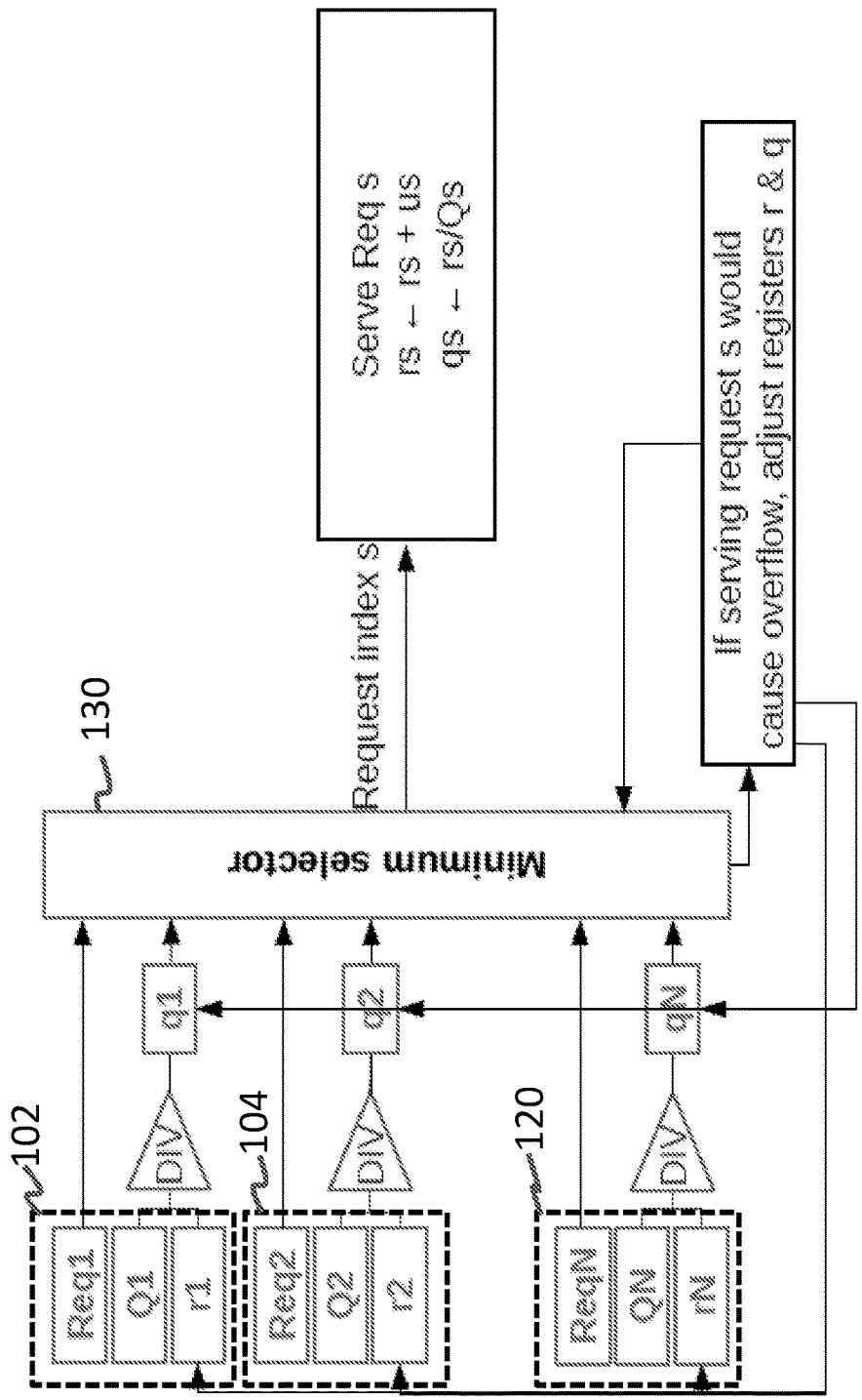
FIG. 2 is another depiction of an exemplary mechanism for an enablement of quota based quality of service that reduces the number of division operations used by caching their results in the new registers $q_i$ which are updated (through a division operation) only as needed.

FIG. 2 is a depiction of a mechanism that improves on the mechanism in FIG. 1 by caching the results of the division operations necessary at every decision step b. Indeed, such operations are costly and it is advantageous to perform a reduced number of them during arbiter operation. The new registers $q_i$, one for each class, store the results of the $r_i/Q_i$ division and only use a recomputation of the division when $r_i$ (or $Q_i$) changes, which occurs with a much smaller frequency than the selection step.

Figure 3:
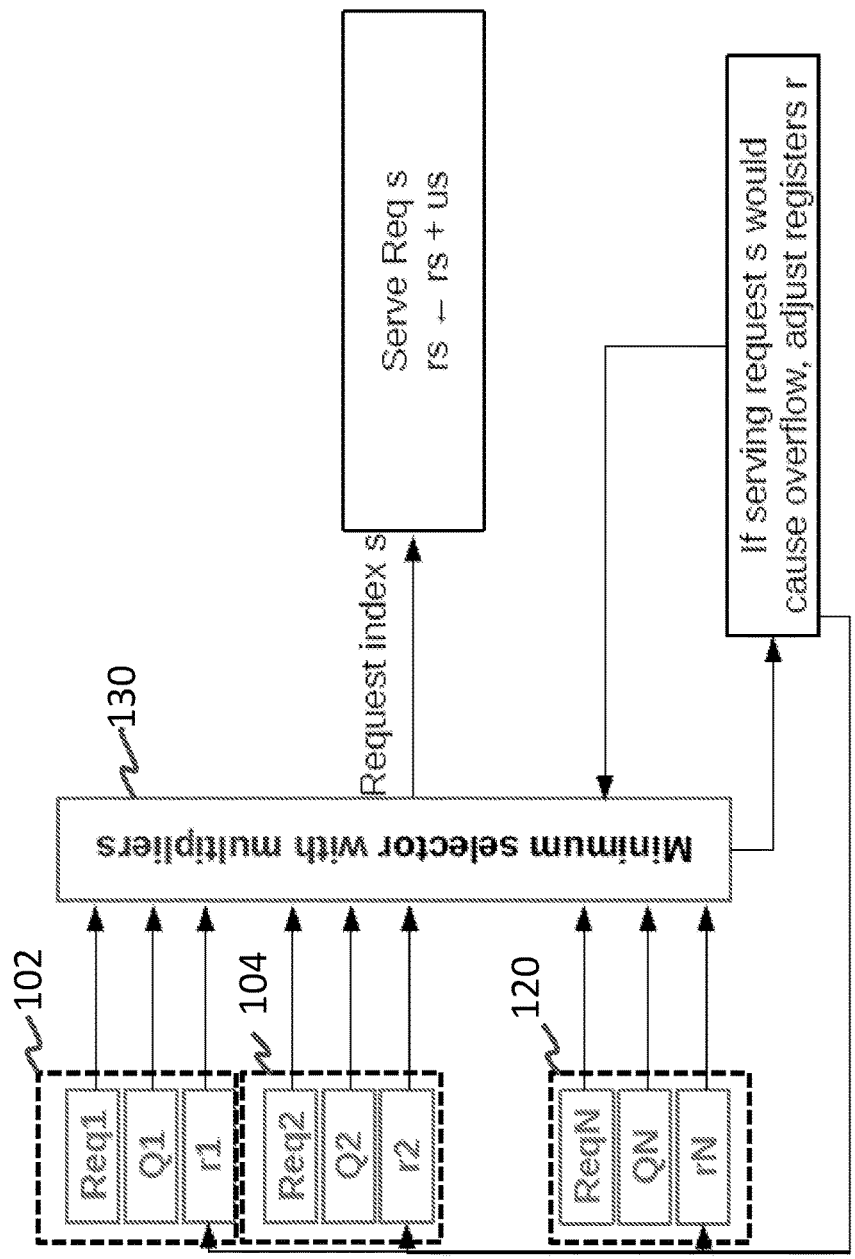
FIG. 3 is yet another depiction of an exemplary mechanism for an enablement of quota based quality of service which reduces the number of divisions in the mechanism from FIGS. 1 to 0, but uses multiplications to perform the selection step.

FIG. 3 depicts a mechanism that improves on the mechanisms in FIGS. 1 and 2. The mechanism in the FIG. 1 performs many divisions, while the mechanism in the FIG. 2 performs fewer divisions but at the expense of using more memory for the internal state (for the extra registers $q_i$. In the FIG. 3, division is eliminated entirely for the common step of every decision by implementing comparisons between competing choices in a slightly different way. While in the FIG. 1, the $r_i/Q_i$ ratio is computed for every choice and the agents are serviced in sequential order of increasing ratio, in the FIG. 3, pairwise comparisons are made for the minimum determination using multiplication instead of division. Indeed, comparing between $r_i/Q_i$ and $r_j/Q_j$ is equivalent to comparing between the products $r_i*Q_j$ and $r_j*Q_i$.

Figure 4:
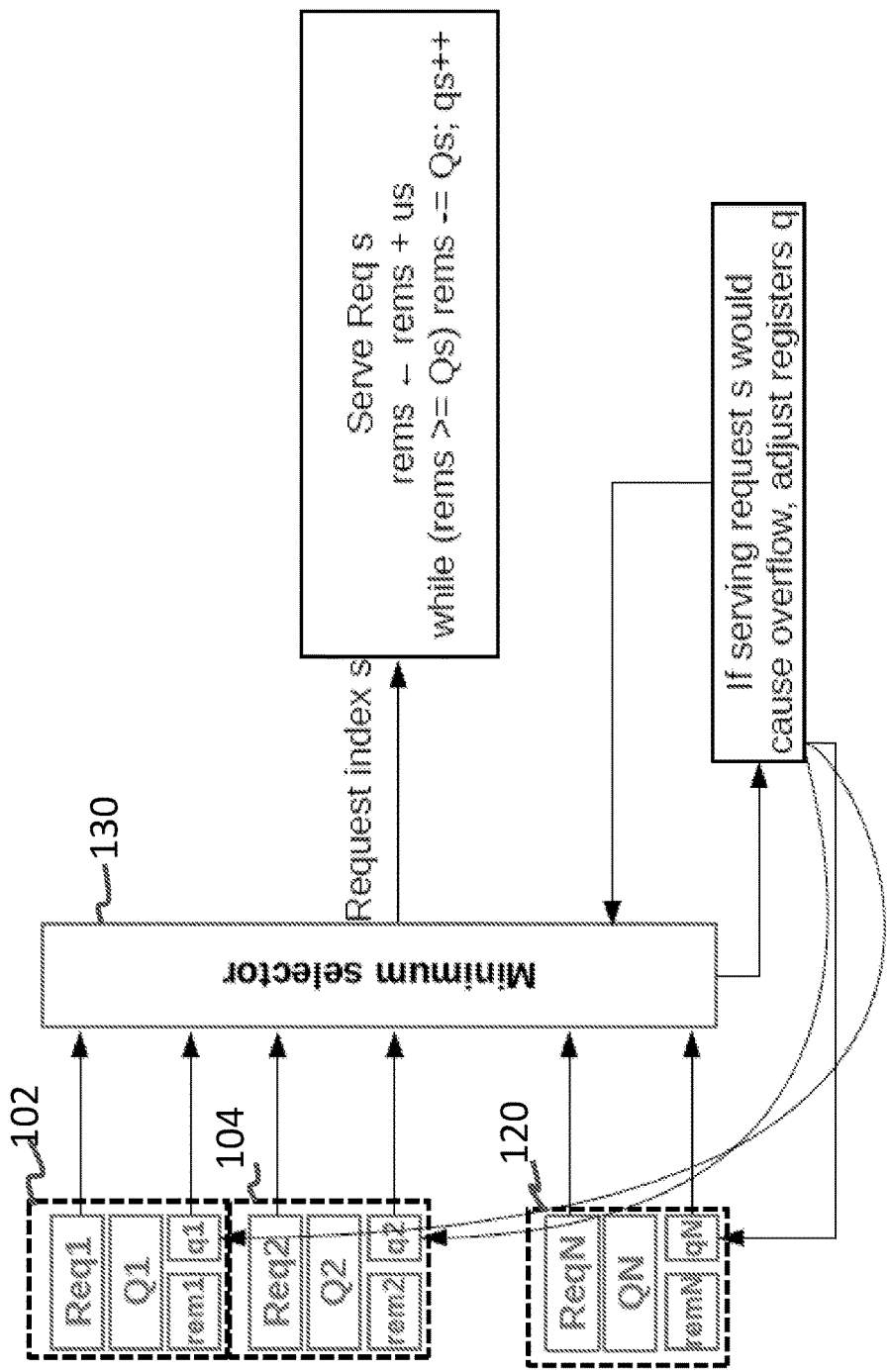
FIG. 4 is yet another depiction of an exemplary mechanism for an enablement of quota based quality of service that improves on all of the mechanisms above by no longer using either divisions or multiplications for selection, and furthermore by simplifying the boundary update step.

FIG. 4 is a depiction of a fourth mechanism that eliminates both the divisions (from 1 and 2) and the multiplications (from 3), which while less costly than division, still imposes a considerable cost on the system.

The following architecture and mechanism is proposed for the FIG. 4. In the FIG. 4, the internal state comprises a pair of $(q_i, rem_i)$ registers, one for each class of service. The per-class register $r_i$ of the FIGS. 1-3 are replaced with two registers: a first register—also called a $q_i$ (quotient) register and a second register—also called a $rem_i$ (remainder register). The $rem_i$ registers have a small fixed size that should be just slightly larger than what is enough to represent the largest $Q_i$. The $q_i$ registers have, as the $r_i$ registers before, an arbitrary size of B bits. Both registers are initially set to zero. In other words, each one of a plurality of $rem_i$ and $q_i$ registers are first set to a value of 0, indicating that no utilization of the one or more resources by an agent has been recorded initially.

The system then makes a decision about which agent of the plurality of agents should receive access to the one or more resources. Making the decision comprises selecting across serviceable classes among the plurality of agents. In general, an agent with a minimum $q_i$ is first serviced. Successive agents are serviced in order of increasing ratio.

In an embodiment, only one class of agents receives access to the one or more resources at a time. After an agent receives access to the one or more resource, the internal state of the system is updated to reflect the fact that the particular of agents has accessed the resource. Updating an internal state of the system state comprises first incrementing the $rem_i$ registers by an amount of usage granted to the serviced class and then while the resulting value is larger than the quota $Q_i$ subtracting from rem, the value of the quota $Q_i$ and for each such subtraction incrementing $q_i$ by 1. Access to the one or more resources is granted to the remaining agents until the internal state can no longer be maintained accurately due to the magnitude of the usage and a boundedness characterizing the internal state.

The system permits further recording of the usage in the internal state by first recording a negative amount of usage in one or more classes of service so that an overflow no longer occurs. the recording of usage in the internal state comprises decreasing a value of register state $q_s$ corresponding to a chosen class of service to allow access to the resource, and further decreasing all non-zero register states $q_i$ by the same amount.

Steps a-d from above are adjusted as follows for the system of the FIG. 4.

a1. $q_i=rem_i=0$;

b1. choose class with minimum $q_i$, break ties either arbitrarily or based on minimum $rem_i$;

c1. $rem_i=rem_i+access\_amount$; while $rem_i \geq Q_i$: $rem_i=rem_i-Q_i$, $q_i+1$;

d1. for all classes with non-zero $q_i$, decrease their respective $q_i$'s by an amount between 1 and the minimum $q_i$ across those values (these are the two values that define the spectrum).

Another advantage of the fourth mechanism is simplifying step d, particularly the choice of the value inside the spectrum which now is straightforward, and uses no division or multiplication as in the mechanisms disclosed in the FIGS. 1-3.

This disclosure is exemplified by the following non-limiting example:

EXAMPLE

This example demonstrates how the mechanism distributes resources between several agents that require different classes of service. In this example, it is assumed that there are 3 classes of service A, B, C with quotas QA=100, QB=10, QC=10 respectively. The state counter can store values up to 127 (B=7 bits). Initially as part of the state initialization (see step "a" above), all registers are set to 0. Thus rA=rB=rC=0.

For this example, it is assumed that classes A and B are continuously serviceable while class C is not yet serviceable. It is also assumed that every resource usage is unitary. First the ratio between the register value and the quota for the respective classes of service is calculated (see step "b" above). Since the ratio for class of service of A is equal to that of the class of service of B (both are 0), the tie may be broken arbitrarily and is it assumed that one can first serve A. In the next step B which has the smaller ratio (0<1/100) is served. In the next step A has the smaller value (1/100<1/10) so A is served. The same occurs in the next step (2/100<1/10) and so on. The service order (starting from the first step) will be 1×A, 1×B, 10×A, 1×B, 10×A, ..., 1×B and this will go on until rA=121 and rB=13.

Following this, an amount of 6×A would be served and the counter cA would reach the maximum value of 127. Following this, in the next selection A would be selected again (127/100<13/10), but updating rA again would cause overflow, so just previous to that update step d is performed (see step "d" above) to decrease the non-zero counters proportionally by the minimum Δ values that keep them≥0 and integer:

$$cB = cB - 1 = 13 - 1 = 12,$$

$$cA = cA - 10 = 127 - 10 = 117,$$

where ΔA=10, ΔB=1, ΔA/QA=ΔB/QB=0.1.

Following this the mechanism serves A (117/100<12/10), particularly 4×A, 1×B, 6×A and again needs to adjust, and so on. The behavior achieved from the point of view of classes A and B is the same as if the internal state were infinite, but with a limited amount of resources used. However, assuming that immediately before the first adjustment (cB=13, cA=127), C becomes serviceable; then according to the selection mechanism C would be served 13 times (exactly catching up to A and B according to the quota specification). Alternatively, if it is only after the first adjustment (cB=12, cA=117) that C becomes serviceable; then according to the selection mechanism, C would be served 12 times (slightly less than what the quota specifies (to obey the quota exactly C would need to be serviced times, the same amount that B was served and 10 times less than A was served), but this is the penalty paid for using limited resources—and not because after this point no further losses are incurred by C if it remains serviceable.

Disclosed herein too is a computer program product comprising a non-transitory storage medium readable by a processing circuit and storing instructions for execution by the processing circuit for performing a method for deadlock avoidance in a network comprising operating a system comprising a plurality of agents that desire access to one or more resources; a plurality of registers that facilitate communication between the plurality of agents and the one or more resources; a processor that is operative to enforce an arbitration mechanism to translate a quota specification for the plurality of agents according to i) servicing all classes of service that are serviceable according to a quota specification; ii) granting access to the one or more resources if an underserviced class is still not serviceable and if a serviceable class continues to request resources despite leading to an increase in an underservice of a non-serviceable class; iii) servicing the underserviced class as soon as it becomes serviceable, iv) recuperating an accumulated disadvantage of the underserviced class until its quota specification is reached; and v) updating the state of the system upon reaching boundary conditions.

InfiniBand (IB) is a loss-less fabric, i.e., it does not drop packets during regular operation. Packets are dropped only in instances of component failure. As such, the undesirable effects of retries and timeouts on data center applications are non-existent. It also supports a connection-oriented reliable transport mechanism that is implemented in hardware. This, along with transport window sizes optimized for wire-speed performance, enables very fast reaction times to handle bursty traffic and movement of congestion points.

IB is a commonly used interconnect in supercomputers that comprises host bus adapters and network switches. IB is scalable and uses a switched fabric network topology. In standard IB architecture, the adapters are responsible for placing outgoing packets onto specific virtual lanes in accordance to the packet service class (service lane) and the Quality of Service (QoS) policies in place. Then, in subsequent switch traversals, the packets will typically occupy that same virtual lane until finally being delivered to a destination adapter. Occupying the same virtual lane ensures that quality of service policies are applied correctly but does not stop dependency cycles for occurring in topologies that are susceptible to deadlock. While changing the virtual lane during traversal of a packet is possible in principle (single way of performing the transition per switch per service lane), the originally envisioned use case for this feature is support for heterogeneous switches, that is, switches disposing of a variable number of resources (virtual lanes).

Quality of Service (QoS) is used to address problems of best-effort service, lower bandwidth and high latency seen in ethernet networks. InfiniBand, because of its inherent bandwidth and latency benefits, has been well deployed in high-performance computing applications where high bandwidth and low latency are de-facto requirements. An important feature of any QoS implementation is the concept of traffic classes or flows. A combination of source and destination addresses, source and destination socket numbers, or a session identifier may be used to define a flow or traffic class. Or more broadly, any packet from a certain application, from an incoming interface, or from a certain user or user group can be defined as a flow of traffic class.

InfiniBand Architecture's (IBA) basic unit of communication is a "message". A message may contain between 0 and 2 gigabytes (GB) of data. Messages are segmented into packets. The payload of each packet must contain the maximum number of bytes negotiated for the lane maximum transmission unit (MTU). Segmentation and reassembly of packets is done by IBA hardware and hence MTU size restrictions are not detrimental to performance in anyway. The most common path MTUs are likely to be 256 bytes and 2048 bytes.

This disclosure also encompasses a computer program product comprising a non-transitory storage medium readable by a processing circuit and storing instructions for execution by the processing circuit for performing a method for deadlock avoidance in a network comprising partitioning virtual lanes into deadlock avoidance virtual channels; and assigning each incoming packet to one of the deadlock avoidance virtual channels in a virtual lane that corresponds to the physical virtual lane that the packet would have travelled along if the network contained no deadlock avoidance virtual channels and as many physical virtual lanes as there are in each virtual channel; and transitioning each packet as it traverses the network from one deadlock virtual channel to another when the deadlock avoidance policy so demands it.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A system comprising:
   a plurality of agents that desire access to a resource;
   a finite amount of an internal state;
   a processor that is configured to enforce an arbitration mechanism to translate a quota specification for the plurality of agents according to a set of rules comprising:
   i) all classes of service that are serviceable are served according to the quota specification;
   ii) if an underserviced class is not serviceable, a serviceable class continues to be granted access to the one or more resources even if the granted access leads to an increase in the underservice of a non-serviceable class;
   iii) as soon as the underserviced class becomes serviceable, it will in priority recuperate its accumulated disadvantage until its quota specification is reached; and
   iv) the internal state is updated upon reaching boundary conditions.

2. The system of claim 1, wherein the internal state comprises $r_i$ registers, one for each class of service and wherein each one of a plurality of $r_i$, registers is first set to a value of 0, indicating that no utilization of the one or more resources by any agent has been recorded initially.

3. The system of claim 2, further comprising making a decision about which agent of the plurality of agents receive access to the one or more resources and wherein making the decision comprises determining a ratio between a value assigned to each one of the $r_i$ registers and a quota $Q_i$ for each of the plurality of agents and selecting across serviceable classes, an agent with a minimum ratio to be serviced first, where i is an integer.

4. The system of claim 3, further comprising servicing successive agents in order of increasing ratio such that only one class of agents receives access to the one or more resources at a time.

5. The system of claim 4, further comprising updating an internal state of the system upon giving a class of agents access to a resource; wherein updating the internal state of the system state comprises incrementing the $r_i$ registers by an amount of usage granted to the serviced class.

6. The system of claim 5, further comprising providing access to the one or more resources until the internal state can no longer be maintained accurately due to the magnitude of the usage and a boundedness characterizing the internal state.

7. The system of claim 6, further comprising permitting further recording of the usage in the internal state by first recording a negative amount of usage in one or more classes of service so that an overflow no longer occurs.

8. The system of claim 7, comprising decreasing a value of register state $r_s$, corresponding to a chosen class of service to allow access to the resource, and further decreasing all non-zero register states $r_i$ by an amount $\Delta_i$ which is chosen as follows
   A1) $\Delta_i \le r_i$
   B1) $\Delta_i/Q_i = \Delta_s/Q_s$, for all i for which where $r_i$ is not zero; where values of individual $\Delta_i$'s are chosen for all classes of service for which the one or more registers $r_i$ is not null.

9. The system of claim 1, wherein the internal state further comprises a pair of ($q_i$, $rem_i$) registers, one for each class of service and wherein each one of a plurality of rem, and $q_i$ registers is first set to a value of 0, indicating that no utilization of the one or more resources by an agent has been recorded initially.

10. The system of claim 9, further comprising making a decision about which agent of the plurality of agents receive access to the one or more resources; and wherein making the decision comprises selecting across serviceable classes among the plurality of agents, an agent with a minimum $q_i$ to be serviced first.

11. The system of claim 10, further comprising a) servicing successive agents in order of increasing ratio; and wherein only one class of agents receives access to the one or more resources at a time; b) updating an internal state of the system upon giving a class of agents access to a resource and wherein updating an internal state of the system state comprises first incrementing the $rem_i$ registers by an amount of usage granted to the serviced class and then while the resulting value is larger than the quota $Q_i$ subtracting from $rem_i$ the value of the quota $Q_i$ and for each such subtraction incrementing $q_i$ by 1.

12. The system of claim 11, further comprising providing access to the one or more resources until the internal state can no longer be maintained accurately due to the magnitude of the usage and a boundedness characterizing the internal state; permitting further recording of the usage in the internal state by first recording a negative amount of usage in one or more classes of service so that an overflow no longer occurs and decreasing a value of register state $Q_s$, corresponding to a chosen class of service to allow access to the resource, and further decreasing all non-zero register states $q_i$ by the same amount.

13. A method comprising:
   operating a system comprising:
   a plurality of agents that desire access to a resource;
   a finite amount of an internal state;

enforcing, using a processor, an arbitration mechanism to translate a quota specification for the plurality of agents according to a set of rules comprising:
  i) servicing all classes of service that are serviceable according to a quota specification;
  ii) granting access to one or more resources if an underserviced class is still not serviceable and if a serviceable class continues to request resources despite leading to an increase in an underservice of a non-serviceable class;
  iii) servicing the underserviced class as soon as it becomes serviceable,
  iv) recuperating an accumulated disadvantage of the underserviced class until its quota specification is reached; and
  v) updating a state of the system upon reaching boundary conditions.

14. The method of claim 13, further comprising making a decision about an agent that receives access to the one or more resources; wherein each one of a plurality of $r_i$ registers is first set to a value of 0, indicating that no utilization of the one or more resources by any agent has been recorded initially; and wherein making the decision comprises determining a ratio between a value assigned to each one of the $r_i$ registers and a quota $Q_i$ for each of the plurality of agents and selecting across serviceable classes, an agent with a minimum ratio to be serviced first.

15. The method of claim 14, further comprising a) servicing successive agents in order of increasing ratio and where only one class of agents receives access to the one or more resources at a time; b) updating an internal state of the system upon giving a particular class of agents access to a resource; and wherein c) updating an internal state of the system state comprises incrementing the $r_i$ registers by an amount accessed for the serviced class of agents.

16. The method of claim 15, further comprising a) providing access to the one or more resources until the internal state can no longer be maintained accurately due to the magnitude of the usage and a boundedness characterizing the internal state; b) permitting further recording of the usage in the internal state by first recording a negative amount of usage in one or more classes of service so that an overflow no longer occurs; and c) decreasing a value of register state $r_s$ corresponding to a chosen class of service to allow access to the resource, and further decreasing all non-zero register states $r_i$ by an amount $\Delta_i$ which is chosen as follows A1) $\Delta_i \leq r_i$
B1) $\Delta_i/Q_i = \Delta_s/Q_s$, for all i for which where $r_i$ is not zero.

17. The method of claim 14, further comprising a) servicing successive agents in order of increasing ratio; and wherein only one class of agents receives access to the one or more resources at a time; b) updating an internal state of the system upon giving a particular class of agents access to a resource and wherein updating an internal state of the system state comprises first incrementing the rem, registers by an amount of usage granted to the serviced class and then while the resulting value is larger than the quota $Q_i$ subtracting from rem, the value of the quota $Q_i$ and for each such subtraction incrementing $q_i$ by 1.

18. The method of claim 17, further comprising a) providing access to the one or more resources until the internal state can no longer be maintained accurately due to the magnitude of the usage and a boundedness characterizing the internal state; and b) permitting further recording of the usage in the internal state by first recording a negative amount of usage in one or more classes of service so that an overflow no longer occurs.

19. The method of claim 18, further comprising decreasing a value of register state $Q_s$, corresponding to a chosen class of service to allow access to the resource, and further decreasing all non-zero register states $q_i$ by the same amount.

20. A computer program product comprising:
  a non-transitory storage medium readable by a processing circuit and storing instructions for execution by the processing circuit for performing a method for deadlock avoidance in a network, the method comprising:
    i) servicing all classes of service that are serviceable according to a quota specification;
    ii) granting access to one or more resources if an underserviced class is still not serviceable and if a serviceable class continues to request resources despite leading to an increase in an underservice of a non-serviceable class;
    iii) servicing the underserviced class as soon as it becomes serviceable,
    iv) recuperating an accumulated disadvantage of the underserviced class until its quota specification is reached; and
    v) updating a state of a system upon reaching boundary conditions.

* * * * *